United States Patent
Burr et al.

(10) Patent No.: US 7,172,374 B2
(45) Date of Patent: Feb. 6, 2007

(54) BACKSPOT FACING TOOL

(75) Inventors: Mike C. Burr, Elgin, SC (US); Hubert Shelley, Jr., Blythewood, SC (US)

(73) Assignee: Cogsdill Tool Products, Inc., Camden, SC (US)

( * ) Notice: Subject to any disclaimer, the term of this patent is extended or adjusted under 35 U.S.C. 154(b) by 433 days.

(21) Appl. No.: 10/734,052

(22) Filed: Dec. 11, 2003

(65) Prior Publication Data

US 2004/0126196 A1  Jul. 1, 2004

Related U.S. Application Data

(60) Provisional application No. 60/437,098, filed on Dec. 30, 2002.

(51) Int. Cl.
*B23B 51/00* (2006.01)
(52) U.S. Cl. ...................... 408/187; 408/180
(58) Field of Classification Search ............. 408/187, 408/198, 150, 154, 180
See application file for complete search history.

(56) References Cited

U.S. PATENT DOCUMENTS

| | | | |
|---|---|---|---|
| 963,596 A * | 7/1910 | Lescure ............... 408/159 |
| 3,372,610 A * | 3/1968 | Johansson ............ 408/199 |
| 3,540,324 A | 11/1970 | Johansson |
| 3,814,535 A * | 6/1974 | Steiner ............... 408/73 |
| 3,827,821 A * | 8/1974 | Swenson ............. 408/59 |
| 4,710,070 A | 12/1987 | Alsen et al. |
| 4,729,699 A * | 3/1988 | Frazzoli ............. 408/152 |
| 5,135,338 A * | 8/1992 | Heule ............... 408/187 |
| 5,507,606 A * | 4/1996 | Steiner .............. 408/93 |
| 5,755,538 A * | 5/1998 | Heule ............... 408/154 |
| 5,839,860 A * | 11/1998 | Steiner .............. 408/180 |

* cited by examiner

*Primary Examiner*—Monica Carter
*Assistant Examiner*—Sara Addisu
(74) *Attorney, Agent, or Firm*—Howard & Howard Attorneys, P.C.

(57) ABSTRACT

A backspot facing tool includes a shaft and a cutting element. The shaft has a first and second ends and a recess located near the first end. The shaft also includes an outer circumference and is centered on a first axis. The cutting element has an inner portion and an outer portion and is pivotally coupled to the shaft about a second axis. The cutting element is movable between a closed position and an open position.

48 Claims, 4 Drawing Sheets

BACKSPOT FACING TOOL

FIELD OF THE INVENTION

The present invention relates generally to tools to machine the rear face of a component, and more particularly, to a tool which is inserted through an aperture in a workpiece and capable of machining the rear face of the workpiece.

BACKGROUND OF THE INVENTION

Often, in manufacturing processes, it is required to machine the rear face of a hole.

Faces requiring machining or deburring located on a front surface of the workpiece may be machined by any suitable tool. However, faces located on the back surface of the workpiece may be more difficult to machine or deburr because of features of the workpiece which do not allow a standard tool to be utilized or it may be inefficient or difficult to position the workpiece to gain access to the back surface. Backspot facing tools, which are inserted through the aperture and are designed to machine a rear face or remove the burr from the back surface are also known in the art.

One such tool is shown in U.S. Pat. No. 4,710,070, entitled "DEVICE IN BACK SPOT FACING TOOLS", issued Dec. 1, 1987 to Per Alsen et al ("Alsen"). The Alsen tool includes a spindle with a wing arranged in a recess of the spindle. The wing includes a wing edge. The wing is pivotal between an inactive position to an active position. When in the inactive position, the wing is pivoted such that the wing is within the circumference of the spindle. Thus, the spindle and wing may be inserted through an aperture in the workpiece. When the wing is in the active position, at least part of the wing is located outside the circumference of the spindle. The Alsen tool is designed such that rotation of the tool is one direction acts to move the wing towards the active position and rotation of the tool in the opposite direction acts to move the wing towards the inactive position.

However, the design of the Alsen tool presents several problems which may prevent the tool from closing. First, particles removed from the workpiece may become trapped or stuck between the wing and the shaft. Furthermore, the force acting on the wing to close the tool is due solely to rotation of the shaft.

The present invention is aimed at one or more of the problems identified above.

SUMMARY OF THE INVENTION AND ADVANTAGES

In one aspect of the present invention, a backspot facing tool having a shaft and a cutting element is provided. The shaft has first and second ends and a recess located near the first end. The shaft also has an outer circumference and is centered on a first axis. The cutting element has an inner portion and an outer portion. The cutting element is pivotally coupled to the shaft about a second axis and is movable between a closed position and an open position. The cutting element further includes an inner surface. The inner surface has a negative shear angle with a plane intersected by the first axis.

In another aspect of the present invention, a backspot facing tool having a shaft and a cutting element is provided. The shaft has first and second ends and a recess located near the first end. The shaft also has an outer circumference and is centered on a first axis. The cutting element has an inner portion and an outer portion. The cutting element is pivotally coupled to the shaft and is movable between a closed position and an open position. The backspot facing tool is adapted to be rotated in a first direction to remove material from a workpiece. The cutting element is adapted to pivot towards the closed position when the backspot facing tool is rotated in a second direction. The second direction is opposite the first direction. The cutting element exhibits an over-center cam action to initiate movement of the cutting element towards the closed position when the backspot facing tool is rotated in the second direction.

In still another aspect of the present invention, a backspot facing tool having a shaft and a cutting element is provided. The shaft has a first and second ends and a recess located near the first end. The shaft has an outer circumference and is centered on a first axis. The cutting element has an inner portion and an outer portion. The cutting element is pivotally coupled to the shaft and is movable between a closed position and an open position. The cutting element includes an outer edge and is movable to an intermediate position. The intermediate position is between the open and closed positions. The outer edge inscribes a first circle when the cutting element is in the open position and a second circle when the cutting element is in the intermediate position. The first circle has a smaller diameter than the second circle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
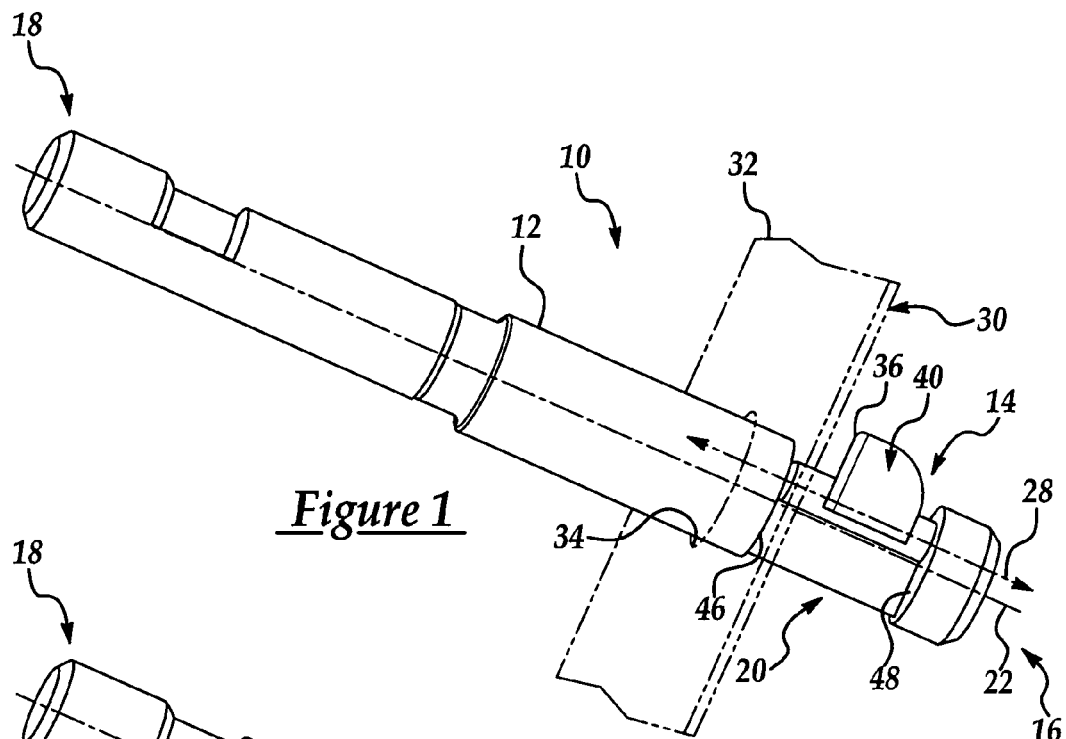
FIG. 1 is a perspective view of a backspot facing tool and a workpiece, according to an embodiment of the present invention.

Referring to the Figures, wherein like numerals indicate like or corresponding parts throughout the several views, a backspot facing tool 10 according to an embodiment of the present invention is shown. The tool 10 includes a shaft 12 and a cutting element 14 pivotally coupled to the shaft 12.

The shaft 12 has a first end 16 and a second end 18. A recess 20 is located near the first end 16. The shaft 12 has an outer circumference 68 (see FIG. 6A) and is centered on a first axis 22.

Figure 3A:
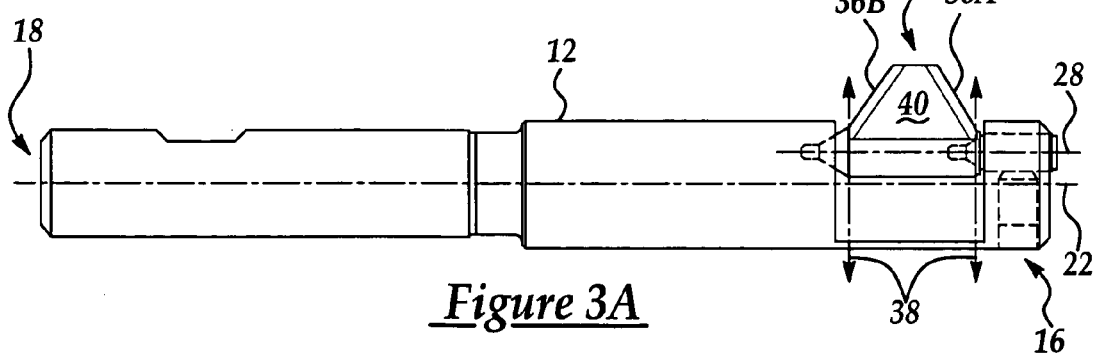
FIG. 3A is a line drawing of the backspot facing tool of FIG. 1.
Figure 3B:
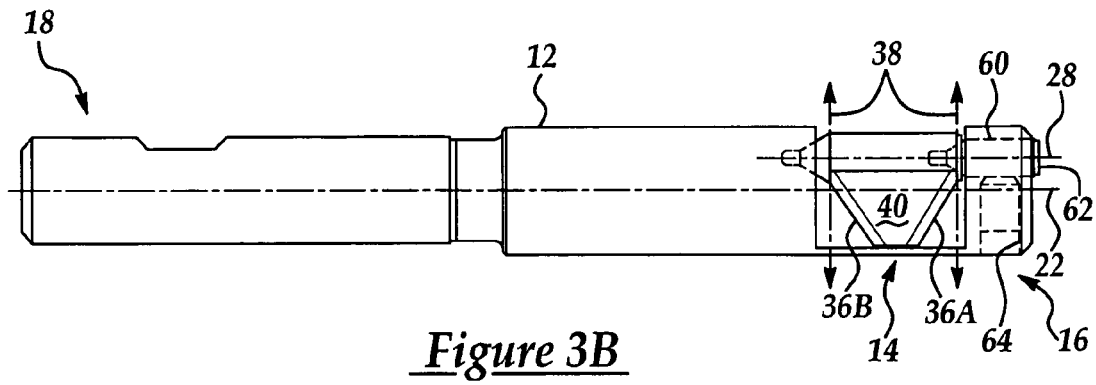
FIG. 3B is a second line drawing of the backspot facing tool of FIG. 1.

The cutting element 14 includes an inner portion 24 and an outer portion 26. The cutting element 14 is pivotally coupled to the shaft 12 about a second axis 28 and is movable between an open position, as shown in FIG. 3A and a closed position, as shown in FIG. 3B. The first and second axes 22, 28 are parallel. In one embodiment, the inner portion 24 and the outer portion 26 of the cutting element 14 are unitarily formed from a compound composed of metal(s) or metalloid(s) and carbon, i.e., a carbide. In another embodiment, the inner portion 24 and the outer portion 26 of the cutting element 14 are removable coupled by one or more fasteners, such as screws, bolts, clips, or any other suitable fasteners. The inner portion 24 and the outer portion 26 may be composed from a carbide or other suitable material.

The backspot facing tool 10 is adapted to remove burrs from a rear surface 30 of a workpiece, generally shown at 32. Typically, the burrs are located around an aperture 34 and are formed when the aperture 34 is formed.

The cutting element 14 includes at least one sharp edge or cutting edge 36 for removing the burrs. The cutting element 14 may be rotated between a closed position and an open position (see below). In use, when the cutting element 14 is in the closed position, the cutting element 14 fits within the outer circumference of the shaft 12 and the tool 10 may be inserted through the aperture 34. As discussed, below, when the tool 10 is rotated in a first direction, the cutting element 14 is rotated towards the open position. When the cutting element 14 is in the open position at least a portion of the cutting element 14 extends outside of the circumference of the shaft 12 and the tool 10 may be used to remove burrs from the workpiece 32. When the cutting element 14 is in the closed position, the cutting element 14 is within an outer circumference of the shaft 12.

The shaft 12 is adapted to be coupled to a variety of devices (not shown) which may be used to rotate the tool 10, such as portable power tools, drill motors, drill presses, automatic equipment, CNC machines, or any other suitable type of equipment.

Figure 2:
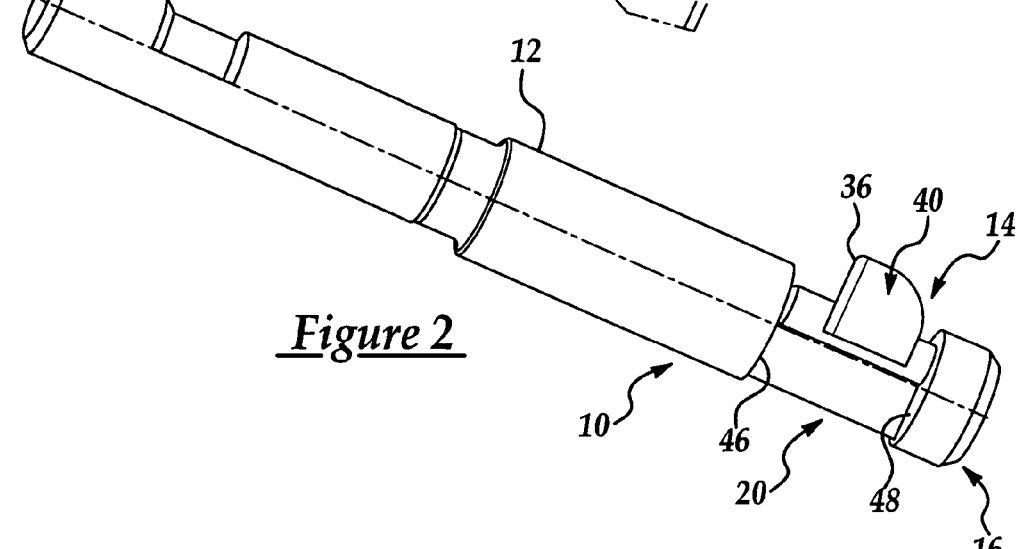
FIG. 2 is a perspective view of the backspot facing tool of FIG. 1.
Figure 5A:
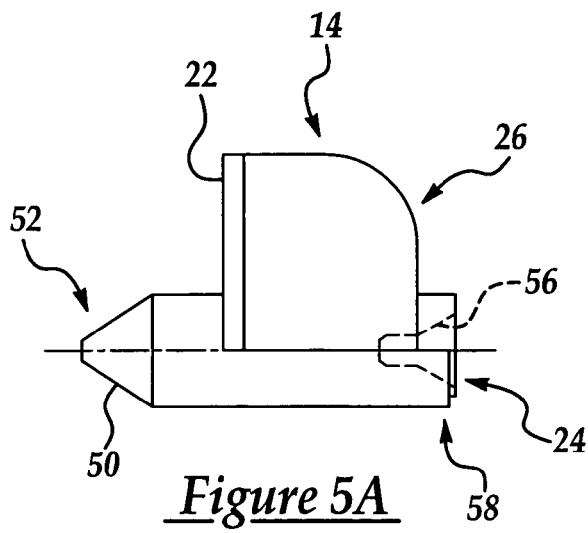
FIG. 5A is a diagrammatic view of a cutting element of the backspot facing tool, according to an embodiment of the present invention.

With particular reference to FIGS. 1, 2 and 5, in one embodiment of the present invention, the cutting element 14 is a back-facing cutting element 14 and has a single cutting edge 36. In the illustrated embodiment, the cutting edge 36 is perpendicular with the second axis 28. However, the cutting edge 36 may be at an angle other than 90 degrees with respect to the first axis 24 (see below).

With particular reference to FIGS. 3A, 3B, and 5, in another embodiment of the present invention, the cutting element 14 is a back chamfering cutting element having first and second cutting edges 36A, 36B. The first cutting edge 22A may be used to remove from a front side 26 of the workpiece 18.

In one aspect of the present invention, each of the first and second cutting edges 36A, 36B forms an angle with a third axis 38, which perpendicular with the second axis 28. For example, in one embodiment the first and second cutting edges 22A, 22B form an angle with the third axis 38 which is less than or equal to 45 degrees. In another embodiment, the first and second cutting edges 22A, 22B form an angle with the third axis 38 which is less than or equal to 30 degrees.

Figure 6A:
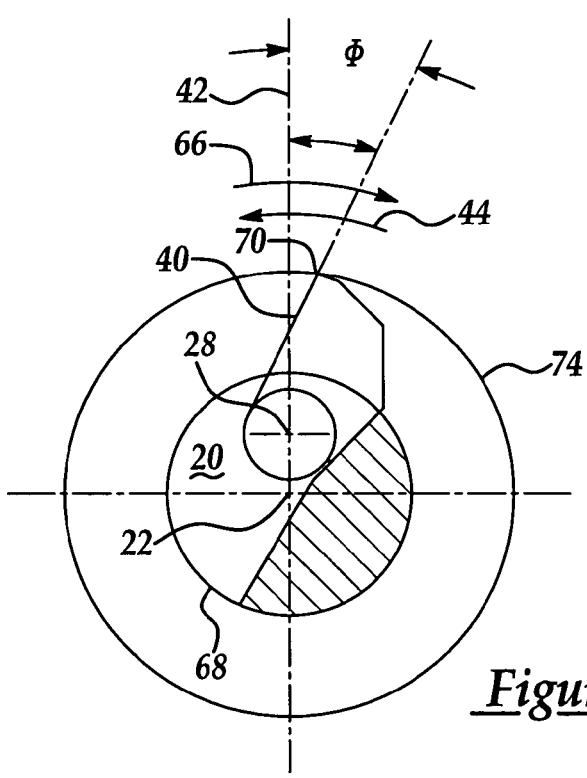
FIG. 6A is a first top down diagrammatic view of the backspot facing tool of FIG. 1 with the cutting element in an open position.

The cutting element 14 further includes an inner surface 40. The inner surface 40 defines a plane which includes the second axis 28. In one aspect of the present invention, the inner surface 40 of the cutting elements has a negative shear angle. With particular reference to FIG. 6A, a plane 42 is defined by the first and second axis 22, 28. The shear angle, Φ, is defined by the plane 42 and the inner surface 40. As stated above, the shear angle is a negative shear angle, i.e., the inner surface 40 is behind the plane 42 when the tool 10 is being rotated in the first direction. In one embodiment, the tool 10 has a negative shear angle of approximately 26 degrees.

As shown in FIG. 6A, when the tool 10 is rotated in a the first direction, as indicated by arrow 44, the cutting element 14 is in the open position. The inner surface 40 faces the first direction. By opening up the inner surface 40 in the first direction, it is less likely that material removed from the workpiece 32 will remain between the cutting element 14 and the recess 20. Thus, the tool 10 will close easier when the shaft 12 is rotated in the second direction.

The recess 20 includes first and second transverse surfaces 46, 48. The first and second transverse surfaces 46, 48 are generally parallel to each other and perpendicular to the first axis 22.

In one embodiment, as shown in FIGS. 3A, 3B, and 5, the cutting element has a male end formed by a centering element and a female end formed by a bore (see below). The inner portion 24 of the cutting element 14 includes a centering element 50 located on a first end 52 of the inner portion 24. The centering element 50 is received within a first centering bore 54 located within the first transverse surface 46 of the recess 20. The inner portion 24 of the cutting element 14 includes a second centering bore 56 located in a second end 58. A retaining screw bore 60 is located at the first end 16 of the shaft 12. In one embodiment, the retaining screw bore 60 receives a retaining screw 62, which is received within the second centering bore 56. The retaining screw 62 holds the cutting element 14 in place while allowing the cutting element 14 to pivot about the second axis 28. A threaded fastener (not shown) may be received by a fastener bore 64. The fastener bore 64 is transverse the retaining screw bore 60. The threaded fastener acts to hold the retaining screw 62 in place.

Figure 3C:
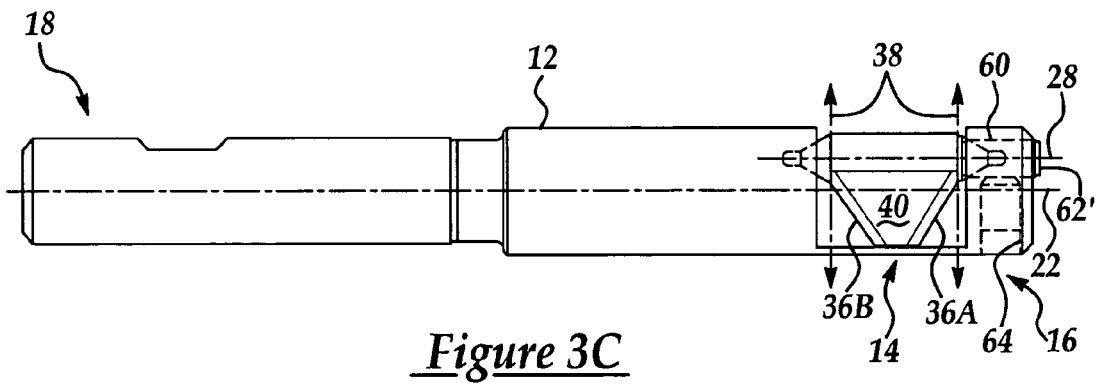
FIG. 3C is a line drawing of the backspot facing tool, according to another embodiment of the present invention.
Figure 4:
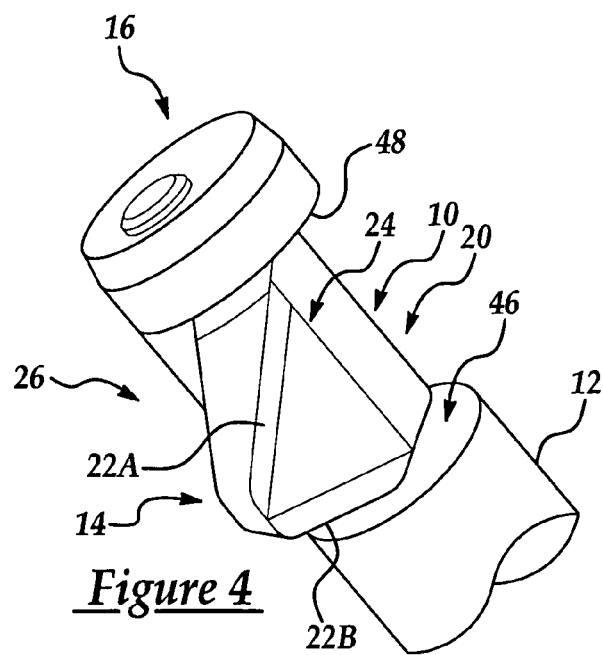
FIG. 4 is an enlarged perspective view of a backspot facing tool, according to an embodiment of the present invention.
Figure 5B:
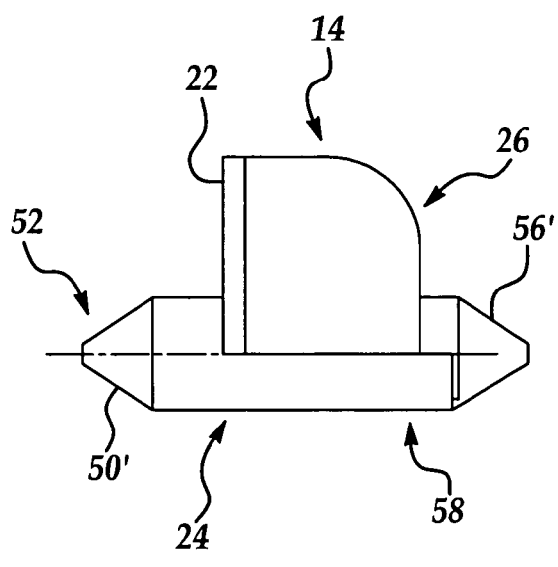
FIG. 5B is a diagrammatic view of a cutting element of the backspot facing tool, according to another embodiment of the present invention.

A cutting element 14 according to another embodiment of the present invention is shown in FIGS. 3C and 5B. In FIGS. 3C and 5B, in which like-elements are labeled the same, the cutting element 14 has two male ends (see below). The first and second transverse surfaces 46, 48 are generally parallel to each other and perpendicular to the first axis 22. The inner portion 24 of the cutting element 14 includes a first centering element 50' located on the first end 52 of the inner portion 24. The centering element 50 is received within a first centering bore 54 located within the first transverse surface 46 of the recess 20. The inner portion 24 of the cutting element 14 includes a second centering element 56' located on the second end 58. The retaining screw 62' receives the second centering element 56'.

In another aspect of the present invention, the cutting element 14 is adapted to pivot towards the closed position when the tool 10 is rotated in a second direction (as shown by arrow 66). The second direction being opposite the first direction. The cutting element 14 exhibits an over-center cam action to initiate movement of the cutting element 14 towards the closed position when the tool 10 is rotated in the second direction.

Figure 6B:
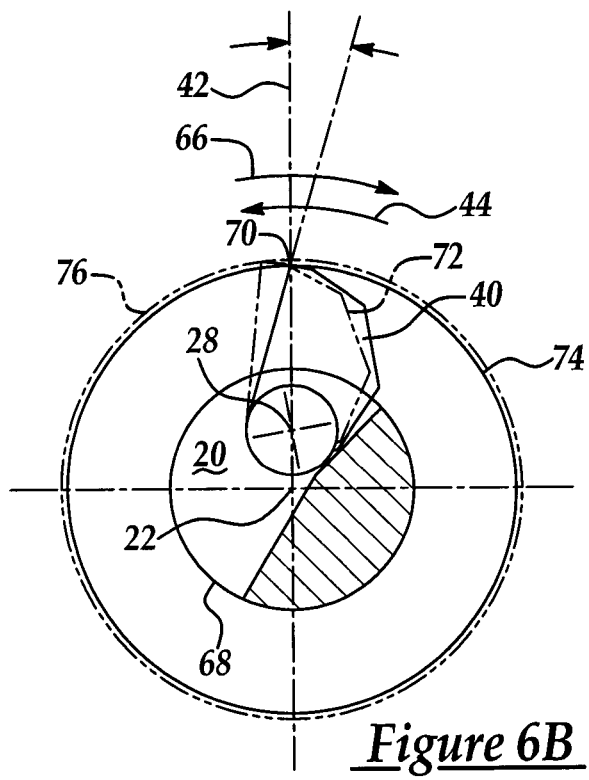
FIG. 6B is a second top down diagrammatic view of the backspot facing tool of FIG. 1 with the cutting element in an intermediate position; and, FIG. 6C is a diagrammatic view of an enlarged portion of FIG. 6B.
Figure 6C:
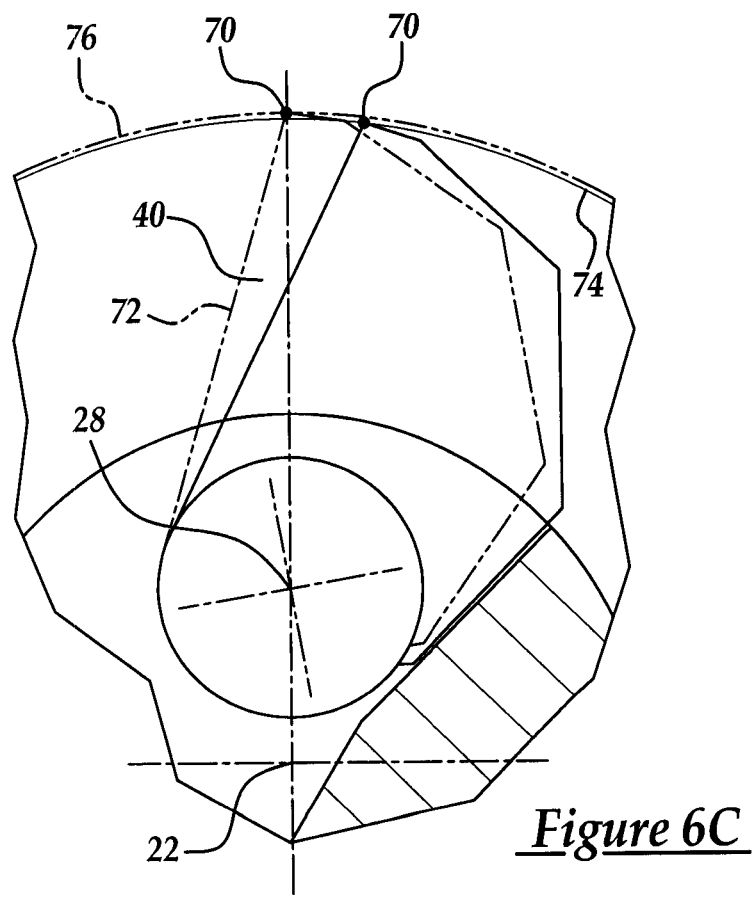

With reference to FIGS. 6A–6C, in one embodiment the cutting element 14 includes an outer edge 70. The cutting element 14 is movable to an intermediate position 72 (shown in dotted lines in FIGS. 6B and 6C). The intermediate position 72 is between the open and closed positions. When the cutting element 14 is in the open position and the tool 10 is rotated in the first direction, the outer edge 70 inscribes a first circle 74. When the cutting element 14 is in the intermediate position 72, the outer edge 70 inscribes a second circle 76. As shown, the diameter (D2) of the second circle 76 is larger than the diameter (D1) of the first circle 74. In use, this arrangement gives the cutting element 14 the over-center cam action. When the tool 10 is first rotated in the second direction, the over-center cam action acts to provide momentum to the cutting element 14 to assist in closing the cutting element 14, i.e., moving the cutting element 14 towards and into the closed position.

Other aspects and features of the present invention can be obtained from a study of the drawings, the disclosure, and the appended claims.

What is claimed is:

1. A backspot facing tool, comprising:
   a shaft having a first end and a second end, a recess located near the first end, the shaft having an outer circumference and being centered on a first axis, the shift being rotated in a first direction about the first axis during cutting; and,
   a cutting element having an inner portion and an outer portion, the cutting element being pivotally coupled to the shaft about a second axis and being movable between a closed position and an open position, the first and second axes being parallel, the cutting element further having an inner surface, the inner surface having a negative shear angle with a plane intersected by the first axis and the second axis when in the open position, a portion of the plane intersecting the cutting element, the negative shear angle being in a direction opposite the first direction from the portion of the plane to the inner surface.

2. A backspot facing tool, as set forth in claim 1, wherein the cutting element is within an outer circumference of the shaft when in the closed position.

3. A backspot facing tool, as set forth in claim 1, wherein the cutting element includes at least one cutting edge.

4. A backspot facing tool, as set forth in claim 3, wherein the at least one cutting edge is perpendicular to the second axis.

5. A backspot facing tool, as set forth in claim 3, wherein the at least one cutting edge forms an angle with a third axis, the third axis being perpendicular to the second axis.

6. A backspot facing tool, as set forth in claim 5, wherein the angle is less than or equal to 30 degrees.

7. A backspot facing tool, as set forth in claim 5, wherein the angle is less than or equal to 45 degrees.

8. A backspot facing tool, as set forth in claim 1, wherein the recess includes first and second transverse surfaces, the first and second transverse surfaces being generally parallel to each other and perpendicular to the first axis.

9. A backspot facing tool, as set forth in claim 8, wherein the inner portion of the cutting element includes a centering element located on a first end, the centering element being received within a first centering bore in the first surface of the recess.

10. A backspot facing tool, as set forth in claim 9, wherein the inner portion of the cutting element includes a second centering bore located in a second end, the shaft includes a retaining screw bore, the second centering bore and retaining screw bore being aligned, the retaining screw bore being adapted to receive a retaining screw, the retaining screw having a second centering element, the second centering element being received in the second centering bore.

11. A backspot facing tool, as set forth in claim 1, wherein the cutting element is unitarily formed.

12. A backspot facing tool, as set forth in claim 1, wherein the cutting element is composed from carbide.

13. A backspot facing tool, as set forth in claim 1, wherein the cutting element includes a removable cutting edge portion, the removable cutting edge portion being coupled to the outer portion.

14. A backspot facing tool, as set forth in claim 13, wherein the removable cutting edge portion is composed from carbide.

15. A backspot facing tool, as set forth in claim 1, wherein the first and second axes are offset.

16. A backspot facing tool, as set forth in claim 1, wherein the backspot facing tool is adapted to be rotated in the first direction to remove material from a workpiece, the inner surface facing the first direction.

17. A backspot facing tool, as set forth in claim 16, wherein the cutting element is adapted to pivot towards the closed position when the backspot facing tool is rotated in a second direction, the second direction being opposite the first direction.

18. A backspot facing tool, as set forth in claim 17, wherein the cutting element exhibits an over-center cam action to initiate movement of the cutting element towards the closed position when the backspot facing tool is rotated in the second direction.

19. A backspot facing tool, as set forth in claim 1, wherein the cutting element includes an outer edge and is movable to an intermediate position, the intermediate position being between the open and closed positions, wherein the outer edge inscribes a first circle when the cutting element is in the open position and a second circle when the cutting element is in the intermediate position, wherein the first circle has a smaller diameter than the second circle.

20. A backspot facing tool, comprising:
    a shaft having a first end and a second end, a recess located near the first end, the shaft having an outer circumference and being centered on a first axis; and,
    a cutting element having an inner portion and an outer portion, the cutting element being pivotally coupled to the shaft and being movable between a closed position and an open position, the backspot facing tool being adapted to be rotated in a first direction to remove material from a workpiece, the cutting element being adapted to pivot towards the closed position when the backspot facing tool is rotated in a second direction, the second direction being opposite the first direction, and wherein the cutting element exhibits an over-center cam action to initiate movement of the cutting element towards the closed position when the backspot facing tool is rotated in the second direction, the cutting element has an intermediate position between the closed position and the open position, the outer portions have an edge, the over-center action being achieved by a distance from the edge to the first axis when the cutting element is in the open position being shorter than the distance when the cutting element is in the intermediate position.

21. A backspot facing tool, as set forth in claim 20, wherein the cutting element is within an outer circumference of the shaft when in the closed position.

22. A backspot facing tool, as set forth in claim 20, wherein the cutting element includes at least one cutting edge.

23. A backspot facing tool, as set forth in claim 22, wherein the at least one cutting edge is perpendicular to a second axis.

24. A backspot facing tool, as set forth in claim 22, wherein the shaft pivots about a second axis and the at least one cutting edge forms an angle with a third axis, the third axis being perpendicular to the second axis.

25. A backspot facing tool, as set forth in claim 24, wherein the angle is less than or equal to 30 degrees.

26. A backspot facing tool, as set forth in claim 24, wherein the angle is less than or equal to 45 degrees.

27. A backspot facing tool, as set forth in claim 20, wherein the recess includes first and second transverse surfaces, the first and second transverse surfaces being generally parallel to each other and perpendicular to the first axis.

28. A backspot facing tool, as set forth in claim 27, wherein the inner portion of the cutting element includes a centering element located on a first end, the centering element being received within a first centering bore in the first surface of the recess.

29. A backspot facing tool, as set forth in claim 28, wherein the inner portion of the cutting element includes a second centering bore located in a second end, the shaft includes a retaining screw bore, the second centering bore and retaining screw bore being aligned, the retaining screw bore receiving a retaining screw, the retaining screw having a second centering element, the second centering element being received in the second centering bore.

30. A backspot facing tool, as set forth in claim 20, wherein the cutting element is unitarily formed.

31. A backspot facing tool, as set forth in claim 20, wherein the cutting element is composed from carbide.

32. A backspot facing tool, as set forth in claim 20, wherein the cutting element includes a removable retaining screw portion, the removable retaining screw portion being coupled to the outer portion.

33. A backspot facing tool, as set forth in claim 32, wherein the removable retaining screw portion is composed from carbide.

34. A backspot facing tool, comprising:
 a shaft having a first end and a second end, a recess located near the first end, the shaft having an outer circumference and being centered on a first axis; and,
 a cutting element having an inner portion and an outer portion, the cutting element being pivotally coupled to the shaft and being movable between a closed position and an open position, wherein the cutting element includes an outer edge and is movable to an intermediate position, the intermediate position being between the open and closed positions, wherein the outer edge inscribes a first circle when the cutting element is in the open position and a second circle when the cutting element is in the intermediate position, wherein the first circle has a smaller diameter than the second circle, the first and second circle being centered on the first axis.

35. A backspot facing tool, as set forth in claim 34, the backspot facing tool being adapted to be rotated in a first direction to remove material from a workpiece, the cutting element being adapted to pivot towards the closed position when the backspot facing tool is rotated in a second direction, the second direction being opposite the first direction.

36. A backspot facing tool, as set forth in claim 34, wherein the cutting element is within an outer circumference of the shaft when in the closed position.

37. A backspot facing tool, as set forth in claim 34, wherein the cutting element includes at least one retaining screw.

38. A backspot facing tool, as set forth in claim 37, wherein the at least one retaining screw edge is perpendicular to the second axis.

39. A backspot facing tool, as set forth in claim 37, wherein the shaft pivots about a second axis and the at least one retaining screw edge forms an angle with a third axis, the third axis being perpendicular to the second axis.

40. A backspot facing tool, as set forth in claim 39, wherein the angle is less than or equal to 30 degrees.

41. A backspot facing tool, as set forth in claim 39, wherein the angle is less than or equal to 45 degrees.

42. A backspot facing tool, as set forth in claim 34, wherein the recess includes first and second transverse surfaces, the first and second transverse surfaces being generally parallel to each other and perpendicular to the first axis.

43. A backspot facing tool, as set forth in claim 42, wherein the inner portion of the cutting element includes a centering element located on a first end, the centering element being received within a first centering bore in the first surface of the recess.

44. A backspot facing tool, as set forth in claim 43, wherein the inner portion of the cutting element includes a second centering bore located in a second end, the shaft includes a retaining screw bore, the second centering bore and retaining screw bore being aligned, the retaining screw bore receiving a retaining screw, the retaining screw having a second centering element, the second centering element being received in the second centering bore.

45. A backspot facing tool, as set forth in claim 34, wherein the cutting element is unitarily formed.

46. A backspot facing tool, as set forth in claim 34, wherein the cutting element is composed from carbide.

47. A backspot facing tool, as set forth in claim 34, wherein the cutting element includes a removable cutting edge portion, the removable cutting edge portion being coupled to the outer portion.

48. A backspot facing tool, as set forth in claim 47, wherein the removable cutting edge portion is composed from carbide.

* * * * *